United States Patent [19]

Bonomi

[11] Patent Number: 4,749,202
[45] Date of Patent: Jun. 7, 1988

[54] SEALING AND GUIDE UNIT FOR PISTONS IN GENERAL

[76] Inventor: Agostino Bonomi, Via Castignidolo 18, Polaveno - Brescia, Italy

[21] Appl. No.: 486,102

[22] Filed: Apr. 18, 1983

[30] Foreign Application Priority Data

Apr. 29, 1982 [IT] Italy ................................ 5161 A/82

[51] Int. Cl.$^4$ ........................ F16J 15/24; F16J 15/56
[52] U.S. Cl. ................................... 277/165; 277/168
[58] Field of Search ......... 277/165, 138, 168, 170–172

[56] References Cited

U.S. PATENT DOCUMENTS 2,736,164  2/1956  Piquerez ............................. 277/165
3,814,445  6/1974  Bitzan ................................. 277/165

Primary Examiner—Robert S. Ward
Attorney, Agent, or Firm—McGlew and Tuttle

[57] ABSTRACT

A sealing and guide unit for pistons comprising an energized elastic ring placed into a corresponding cavity or groove and a rigid antifriction ring fitted on said elastic ring and projecting at both its sides to cover the extended borders of said cavity or groove. The section of said-rigid ring being very small the radial thrust of said energized elastic ring produces a curvature in the direction of its cross section so that only the central portion of the ring will adhere with a limited friction to the inner surface of the piston chamber, while the lateral portions of the ring are supporting the lubricating effect.

3 Claims, 1 Drawing Sheet

SEALING AND GUIDE UNIT FOR PISTONS IN GENERAL

FIELD AND BACKGROUND OF THE INVENTION

The present invention relates to a sealing and guide unit for pistons in general.

As far as pistons and in particular the necessity to ensure a dynamic seal between surfaces with an alternate relative motion are concerned, many variously shaped and combined sealing elements have been proposed, also to ensure a correct alignment and guide between the relevant surfaces.

It has however been noticed that if the packing means are elastic enough to ensure a tight sealing they cannot be rigid as required for a safe guide or support of a surface, e.g. that of a piston, in respect to another surface, e.g. that of the cylinder for the piston.

In fact, when using any sealing elements made of a sufficiently elastic material to ensure a tight seal and at least a certain aligning or supporting effect, there is always an excessive and wearing friction owing to specific stresses and causing a rapid deterioration of the whole unit. If instead the materials employed have the rigidity required for a correct guide or support, the seal will never be tight enough to prevent substantial and unbearable leaks due to excessive tolerances.

As a matter of fact, some trials have already been made to solve the problem of a perfectly tight seal also acting as a guide or support, but so far the results achieved have not been sufficient to comply with the known requests.

One of the solutions proposed to this end is a sealing and guide system comprising a ring of elastic material to ensure static sealing which is peripherally coupled with a ring of antifriction material acting as a dynamic sliding seal. This assembly features a fair elastic reaction allowing the self-alignment of the piston, but on the other hand it is not able to ensure a sufficient guiding support, in particular when the piston is subject to radial thrusts, while said thrusts are usually present in this kind of assemblies. That is why, to ensure a correct support, at least a second rigid ring of antifriction material is added and placed in parallel to the sealing unit composed of the closely coupled elastic and rigid rings. The additional guide ring is usually a split ring fitted into a groove made available for this purpose. In this way the original composite unit is substantially a sealing unit, the additional ring acting as a supporting and guiding element for the piston inside its chamber.

The above described structure, however, requires higher production costs and also increases the dimensions of the piston and those of the whole assembly.

Several other solutions have also been proposed, using changes in shape, dimensions and sections, but none of them has so far achieved any really satisfactory results.

SUMMARY OF THE INVENTION

It is therefore the object of the present invention to design a sealing unit for pistons ensuring a perfectly tight seal and an efficient guide for the piston at the same time, said unit being composed of simple elements of low cost which may also be used on pistons of limited length to achieve compact over-all dimensions.

In particular, the present invention relates to a sealing and guide unit for pistons comprising only one energized (i.e. compressed) elastic ring fitted into a corresponding groove of the piston and of only one rigid ring of antifriction material peripherally bearing on said elastic ring and of such an axial length to project beyond both sides of said elastic ring, the lateral borders of the section of said rigid ring resting on two steps made available at both sides of the groove containing the elastic ring.

BRIEF DESCRIPTION OF THE INVENTION

An indicative embodiment of the invention will be described basing on the accompanying drawing, where FIG. 1 is a perspective and separate view of both the rigid and the elastic rings designed to compose the sealing unit; and FIG. 2 is an enlarged sectional view of a piston fitted with said sealing unit and its cylinder.

DESCRIPTION OF THE PREFERRED EMBODIMENT

Figure 1:
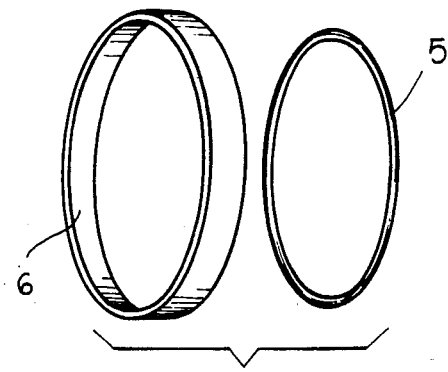

As show in the drawing a piston 1 is designed to slide and revolve in a chamber 2 delimited by a cylinder 3, a sealing and guide unit 4 being positioned between said piston 1 and the inner surface of said chamber 2.

According to the invention said unit 4 is composed of an energized or compressed elastic ring 5, e.g. by an O-ring seal, and of a rigid ring 6 made of antifriction metal and featuring a substantially rectangular section. The axial length of said rigid ring 6 is surpassing the maximum diameter of the cross section of the elastic ring 5, its borders 6'—6' projecting at both sides of said elastic ring 5 and bearing on seats or steps 8 at both sides of cavity or groove 7. The radial surfaces delimiting seats or steps 8 cooperate with borders 6'—6' of said rigid ring 6 to prevent its axial displacements and also to prevent the elastic ring 5 from coming out of its cavity or groove 7.

The axial length of the rigid ring 6 and its section are suitably calculated in such a way that once the two rings are assembled the action of ring 5 inside the rigid ring 6 causes a bulging or convexity in the central portion 16 of said rigid ring 6. Said bulging or convexity 16 causes an enlargement of the central diameter of ring 6 and at the same time a tightening of borders 6'—6' to ensure its seat on steps 8.

Thus the rigid ring 6 will slide on the inner surface of chamber 2 lodging piston 1 with its central and bulging portion 16, while its end portions 6'—6' are detached from the surface by conical spaces 15 tapered towards said central portion 16. Technical trials and tests have shown that the ratio of length to section of said rigid ring may be, for instance, comprised between 5:1 and 15:1, also depending on the outer diameter of piston ring 5., while the ratio that the length of the rigid ring 6 bears to the outer diameter of the elastic ring 5 shall be substantially comprised between 1.2:1 and 3:1. Within the range of these ratios the sealing will be sufficiently tight but not so close as to cause a fast wear out of the lubricating film. In addition, the sealing pressure is the same all along the sealing portion, while the end sections of the rigid ring do not act on the lubricating film, thus preventing its removal.

The above specified construction features and assembly ensure a perfect sealing and a correct guide between the surfaces subject to relative displacements of any kind, definitely improving their behaviour and results in comparison to those so far achieved by any known system.

Figure 2:
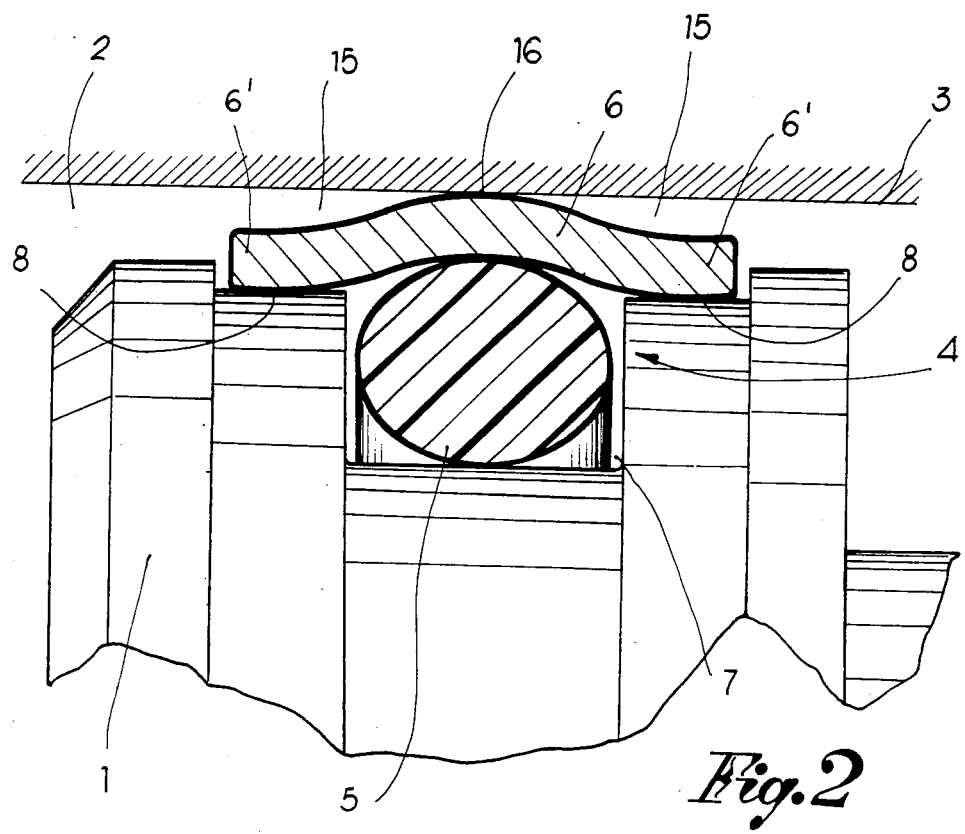

As a matter of fact, owing to the rectilinear and centered motion of piston 1 in chamber 2, minimum friction and maximum lubrication as well as a faultless sealing are thus achieved. Friction is reduced to a minimum due to the fact that, as described above and in particular as shown in FIG. 2, the portion contacting the inner surface of chamber 2 and sliding thereon is very small being restricted to the convex central portion 16 of the rigid ring 6. Lubrication is at its best as the surfaces delimiting the conical spaces 15 are taking the lubricant, no matter if it is solid or fluid, towards the sliding central portion 16 without breaking or entraining or scraping the lubricating film covering the inner surface of chamber 2, independently from the direction into which the piston is moving if it is subject to alternate motions.

During rectilinear displacements of the piston the above described features are maintained even in the presence of remarkable lateral i.e. radial thrusts acting on the piston, said thrust being automatically counterbalanced by the elastic reaction of the sealing unit which is selfcentering and selfadjusting.

In this case said unit will be flattened on its side which is subject to the radial thrust, while the sliding and bearing surface is suitably enlarged without however being flattened, thus being still able to conveniently support the piston. As soon as the radial thrusts are dwindling, the sealing unit will immediately readjust itself into its original position to grant the piston its correct sealing, guide and support.

I claim:

1. A piston/cylinder with sealing and guide device comprising:
    a cylinder defining an axially extending chamber with a slide surface;
    a piston movable in said chamber across said slide surface, said piston having an annular seat with a pair of axially spaced radial surfaces extending toward said slide surface and an annular groove disposed in said seat having an axial width less than an axial width of said seat;
    a precompressed elastic ring disposed in said annular groove which is compressed radially inwardly toward said piston and away from said slide surface; and
    a rigid ring made of anti-friction material disposed in said seat and confined between said pair of spaced radial surfaces, said rigid ring having an intermediate bulging portion having an outer surface bulging convexly outwardly toward and into sealing engagement with said slide surface and an inner surface engaged by said elastic ring and biased outwardly by said elastic ring toward said slide surface, said rigid ring having a pair of opposite borders each disposed in a portion of said seat on respective opposite sides of said annular groove and against said piston, each of said borders spaced radially inwardly of said slide surface.

2. A device according to claim 1, wherein said rigid ring is made of anti-friction metal.

3. A device according to claim 2, wherein said rigid ring has an axial length which is from 5 to 15 times a radial width of said rigid ring, said axial length of said rigid ring being from 1.2 to 3 times an outer diameter of said elastic ring.

* * * * *